(12) United States Patent
Prasad (10) Patent No.: US 10,246,192 B1
(45) Date of Patent: Apr. 2, 2019

(54) PASSENGER SEAT MODULE (71) Applicant: PANASONIC AVIONICS CORPORATION, Lake Forest, CA (US)

(72) Inventor: Birendra Prasad, Tustin, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 243 days.

(21) Appl. No.: 15/249,255

(22) Filed: Aug. 26, 2016

(51) Int. Cl.
| | |
|---|---|
| *B64D 11/06* | (2006.01) |
| *A47B 81/06* | (2006.01) |
| *B60N 2/02* | (2006.01) |
| *B61D 33/00* | (2006.01) |
| *B60N 2/20* | (2006.01) |
| *B60N 2/24* | (2006.01) |
| *B60N 3/00* | (2006.01) |
| *B64D 11/00* | (2006.01) |
| *B60R 11/02* | (2006.01) |
| *B61D 37/00* | (2006.01) |
| *B60N 2/90* | (2018.01) |
| *B60R 11/00* | (2006.01) |

(52) U.S. Cl.
CPC ........ *B64D 11/0605* (2014.12); *A47B 81/062* (2013.01); *A47B 81/064* (2013.01); *B60N 2/0232* (2013.01); *B60N 2/20* (2013.01); *B60N 2/242* (2013.01); *B60N 2/995* (2018.02); *B60N 3/001* (2013.01); *B60R 11/0235* (2013.01); *B61D 33/005* (2013.01); *B61D 33/0007* (2013.01); *B61D 37/00* (2013.01); *B64D 11/0015* (2013.01); *B64D 11/064* (2014.12); *B64D 11/0606* (2014.12); *B64D 11/0638* (2014.12); *B64D 11/0643* (2014.12); *B60R 2011/0003* (2013.01); *B60R 2011/0094* (2013.01); *B64D 2011/0046* (2013.01)

(58) Field of Classification Search
CPC . B64D 11/605; B64D 11/602; B64D 11/0638; B64D 11/0015; B64D 11/0606; B60N 3/001; B60R 11/0235
See application file for complete search history.

(56) References Cited

U.S. PATENT DOCUMENTS

| | | | |
|---|---|---|---|
| 5,028,016 A | 7/1991 | Kelvin et al. | |
| 6,752,444 B2 * | 6/2004 | Kitano | B60R 7/04 296/184.1 |
| 8,177,174 B2 | 5/2012 | Griepentrog | |

(Continued)

*Primary Examiner* — Philip J Bonzell
(74) *Attorney, Agent, or Firm* — Brian Furrer (57) ABSTRACT

A passenger seat module in which one or more of the modules can be installed in the cabin of a vehicle, such as an airplane, train, bus, automobile, etc. The passenger seat module includes a passenger seat, such as an adjustable reclining seat. A movable console having a table top is positioned in front of the seat and is slidably coupled to at least one rail mounted in the floor of the vehicle or to the module. The rail extends from the front of the module to about proximate the front portion of the seat, such that the console is slidable along the rail between the front of the module and a position just in front of the seat. The video monitor may be liftable substantially vertically through an opening in the table between a stowed position below the table to a viewing position above the table.

20 Claims, 8 Drawing Sheets

(56) References Cited

U.S. PATENT DOCUMENTS

| | | | |
|---|---|---|---|
| 8,485,470 B2 * | 7/2013 | Hankinson | B64D 11/06 |
| | | | 244/118.6 |
| 8,979,189 B2 * | 3/2015 | Henshaw | A47B 83/02 |
| | | | 297/135 |
| 9,169,020 B2 | 10/2015 | Roll et al. | |
| 9,266,614 B2 * | 2/2016 | Henshaw | B60N 2/01 |
| 9,382,007 B2 | 7/2016 | Ersan et al. | |
| 9,469,405 B2 * | 10/2016 | Henshaw | B60N 3/002 |
| 2003/0234550 A1 * | 12/2003 | Brooks | B60R 7/04 |
| | | | 296/24.46 |
| 2007/0246981 A1 | 10/2007 | Plant | |
| 2013/0241247 A1 | 9/2013 | Wallace et al. | |
| 2016/0376008 A1 * | 12/2016 | Kuyper | A47B 5/006 |
| | | | 244/122 R |

\* cited by examiner

PASSENGER SEAT MODULE

BACKGROUND

The field of the invention generally relates to vehicle passenger seats, and more particularly, to a premium class passenger seat module having a movable console for a table and/or video monitor.

Vehicle passenger seats, such as passenger seats in aircraft, trains, automobiles, etc., are typically arranged in rows of individual seats mounted to the floor of the vehicle (e.g., an aircraft) cabin. In regular class seating, such as economy-class, the seats are adjacent to each other and are not separated by any physical boundaries or walls, except the armrests and boundaries of the seating surfaces including the seat-bottom and seat-back. However, in some premium-class seating, for example in a business-class cabin or first-class cabin on an aircraft, seating arrangements can take the form of individual seating areas separated and surrounded by walls and/or partitions. A typical seating area may include an adjustable reclining seat (e.g., lay-flat seats, which recline to a flat configuration or may substantially convert into a full flat-bed). The seating area may also include space for desktops, an entertainment system display, and provide easy access to communication equipment such as Internet, WiFi and/or phone connections, as well as ports for power and storage compartments, etc. Some premium seating space areas in large aircraft provide individual "suites" comprising separate rooms having even more amenities.

With the development of more luxurious seating arrangements for vehicles, such as partitioned seating areas and suites in aircraft, there is a need to optimize the use of the available space within each allocated partition area while providing more and improved equipment and furnishings with adjustable features and amenities for greater passengers comfort. The amenities may include various sources of entertainment and communication tools for conducting business while traveling. At the same time, there is a need for passenger to control, reorganize and/or re-optimize the allocated seating space by re-positioning the equipment within the available space of a vehicle cabin allocated to the passenger for the trip, while maintaining passenger personal and/or business preferences. For example, preferences concerning amenities in different situations, such as seating, eating, reading, working, resting, or sleeping) while still adhering to built-in aircraft safety considerations when in flight and enjoying a pleasing overall cabin ambience.

SUMMARY

Accordingly, the present invention is directed to an innovative passenger seat module in which one or more of the modules can be installed in the cabin of a vehicle, including without limitation an airplane, train, bus, automobile, etc. In one embodiment, the passenger seat module includes a passenger seat, typically an adjustable reclining seat. The seat is positioned toward the rear of the module and when the seat is occupied by a passenger, the passenger faces toward the front of the module. The module may be oriented facing the front of the vehicle or the rear of the vehicle, so the front and rear of the module are relative to the direction the seat is facing (i.e., the seat is facing the front the module means that a seated passenger is facing toward the front of the module).

A movable console having a table is positioned in front of the seat and is slidably coupled to at least one rail mounted in the floor of the vehicle. For example, a pair of parallel rails may be used with one positioned on each side of the console. The rail extends from the front of the module to about proximate the front portion of the seat, such that the console is slidable along the rail between the front of the module and a position just in front of the seat.

The console may be coupled to the rail by any suitable means, such as a runner attached to the bottom of the console, wherein the runner slidably couples to the rail. The runner may have a locking mechanism for locking the runner to a respective rail to lock the console in position.

When the console is at the front of the module, the console is out of the way so a passenger has easy ingress and egress to the seat, and the console is spaced apart from the seat to allow the seat to fully recline with a footrest extending forward from the seat. With the console just in front of the seat, the table is usable by the passenger for eating, drinking, or other table-top activities, or as a desk for supporting a computer, reading, writing or other desk top functions.

In another aspect of the passenger seat module, a video monitor is disposed in the console. The video monitor is typically a monitor for an in-seat entertainment system, such as an in-flight entertainment system for displaying movies, or other audio-video content. Thus, the console can be moved longitudinally in order to bring the video monitor to a passenger's preferred position for viewing the video monitor. In still another feature, the video monitor may be movable vertically through an opening in the table between a stowed position below the table and a viewing position above the table. For instance, the video monitor may lift vertically up and down through the opening in the table.

In still another aspect, the console may include a motorized lift-actuator coupled to the video monitor, which can be actuated to lift the video monitor between the stowed position and the viewing position.

In yet another aspect of the passenger seat module, the console may be movable to three lockable positions along the rail in which the console can be locked in position. For example, the lockable positions may include a first position at the front of the module (this position may be considered a "stowed position" for takeoff and landing on an airplane), a second position proximate the front of the seat (e.g., for the passenger to use the table), and a third position between the first position and second position such that the console is spaced apart from the seat to allow a footrest to extend forward from the seat (e.g., for viewing the video monitor).

In still another aspect of the present invention, the passenger seat module may include a runner-actuator for moving the console along the rail, for example, to each of the three locking positions, or to any other desired position in between. The runner-actuator may be motorized, or driven by any other suitable actuation device.

In another feature, the passenger seat module may include an enclosure. The enclosure may comprise a front wall at the front of the module, a rear wall at the rear of the module, a first side wall extending from the front wall to the rear wall on an entrance side of the module, and a second side wall also extending from the front wall to the rear wall but on an opposite side to the entrance side of the module. The first side wall have an entrance opening for a passenger to enter or exit the module.

Another embodiment of the present invention is directed to a seating arrangement of a plurality the passenger seat modules as described herein. The seating arrangement may include a plurality of the passenger seat modules arranged side-by-side, and/or end-to-end in a substantially rectangular array or other pattern.

Accordingly, the present invention provides an innovative passenger seat module having an adjustable console and/or retractable video monitor, as well as a seating arrangement of a plurality of the modules.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant.

DETAILED DESCRIPTION

The present invention is directed to a passenger seat module for a vehicle, such as an airplane, train, bus, automobile, ship, etc. One or more of the modules can be installed either in side-by-side orientations (along the width of the aircraft) or end-to-end orientations along the length of the cabin by mounting each module to the floor of the cabin.

In the case of a plurality of modules, the modules may be arranged in any array or any pattern depending upon the available number of aisles, length, and width of the aircraft cabin. Although the embodiments described herein are directed to passenger seat modules mounted in a passenger aircraft cabin with two aisles, the present invention is not limited to only such installations, but can be utilized for configurations having less than two or more than two aisles, on any type of vehicle, or in any other available designated space for that matter, (such as passenger lounge area often found at airports).

Figure 1:
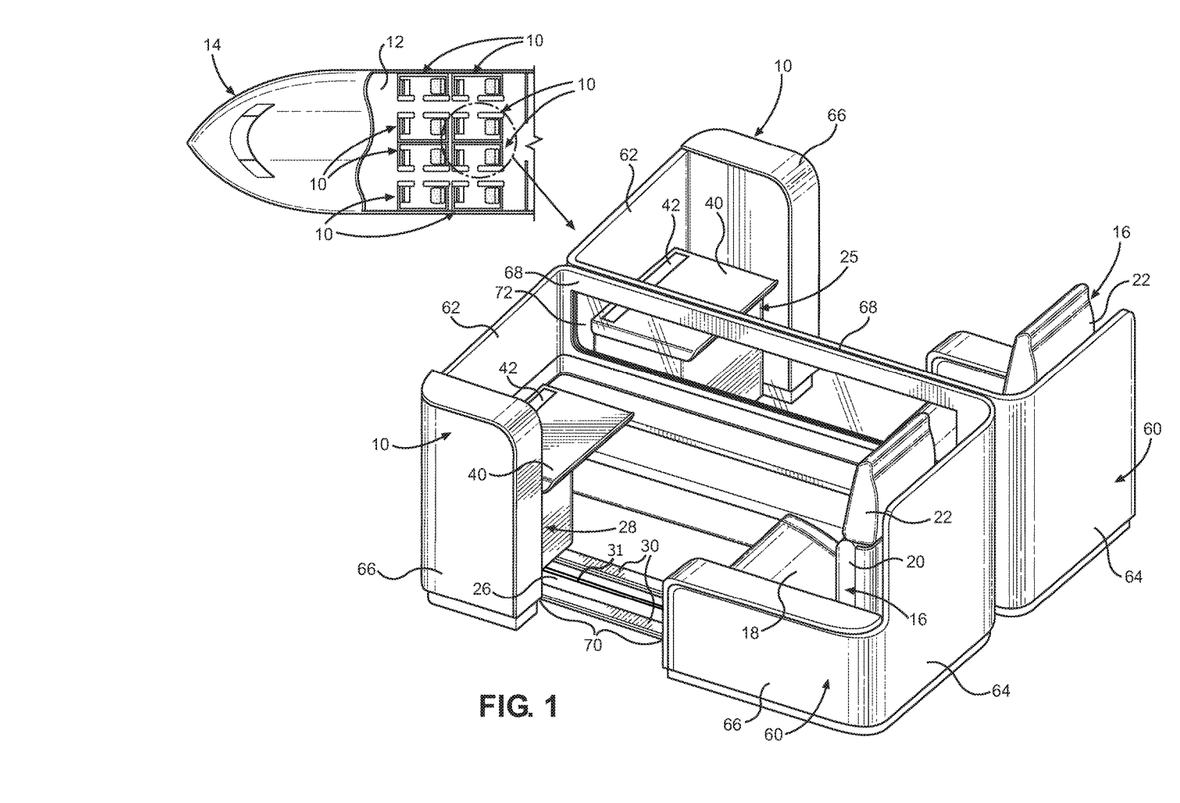
FIG. 1 is a top view of a seating arrangement of a plurality of passenger seat modules in a cabin of an airplane, in which the bottom right portion of FIG. 1 shows an enlarged perspective view of two passenger seat modules (positioned side-by-side from the seating arrangement) with the consoles in the stowed-position, according to one embodiment of the present invention.
Figure 3:
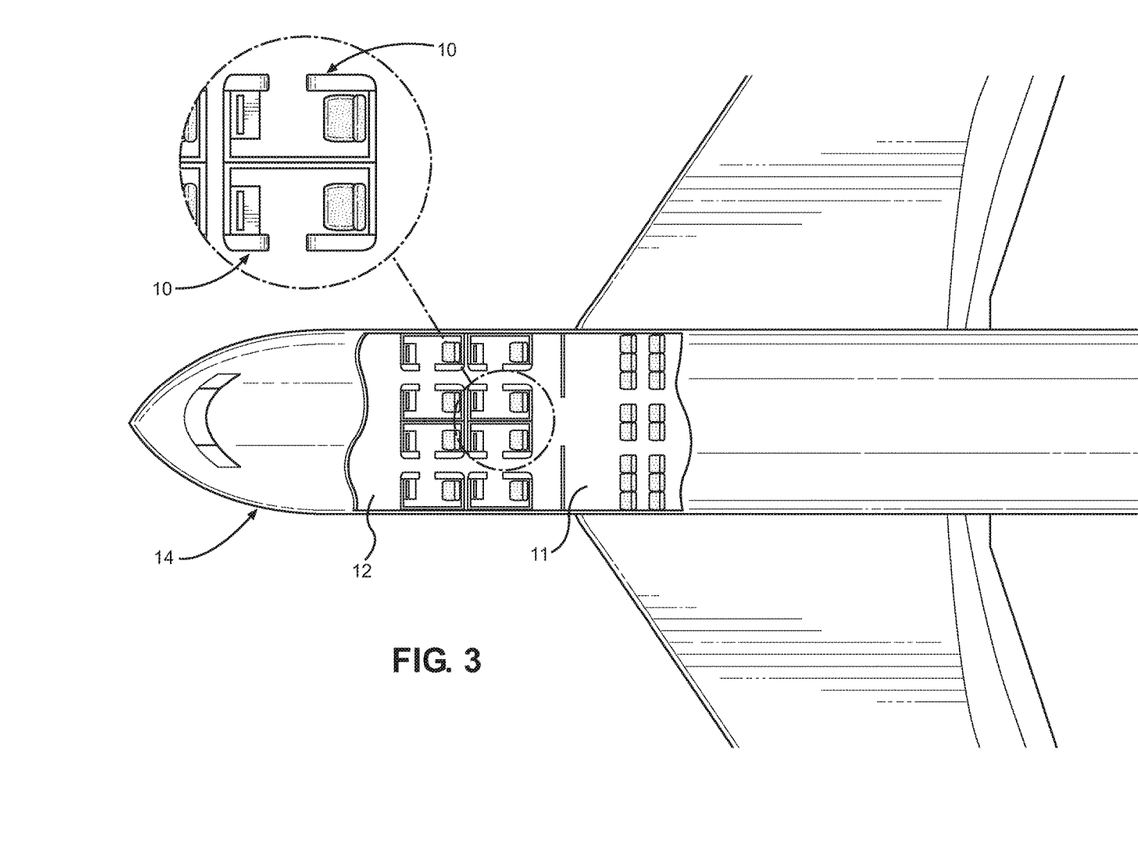
FIG. 3 is a top view of a typical seating arrangement of a plurality of passenger seat modules in a cabin of an aircraft with two aisles, and an enlarged side perspective view of two passenger seat modules arranged side-by-side (shown on the top left), according to one embodiment of the present invention.

Referring to FIG. 1, one embodiment of a passenger seat module 10 is shown in which a plurality of passenger seat modules 10 are installed in an aircraft cabin 12 of an airplane 14. In the embodiment of FIG. 1, the passenger seat modules 10 are arranged in a rectangular array or pattern. The modules 10 may be arranged side-by-side relative to each other (e.g., the modules 10 in the enlarged view of FIG. 1 are arranged side-by-side). Passenger seat modules 10 can also be arranged end-to-end with respect to one another (e.g., all of the modules 10 in the cabin 12, see the top left view of FIG. 1, are end-to-end with another module 10), or a combination of both side-by-side and end-to-end (e.g., the modules in the middle of the cabin 12, including the modules in the enlarged view of FIG. 3 are both side-by-side and end-to-end to other modules 10). As shown in FIG. 3, the modules 10 may be arranged in a first-class or business-class cabin 12 at the front of the airplane 14, with other class cabin(s) 11 located behind the cabin 12. For wider width aircraft having more spacious accommodations, the seat modules may be optionally provided in non-premium classes as well.

Figure 6:
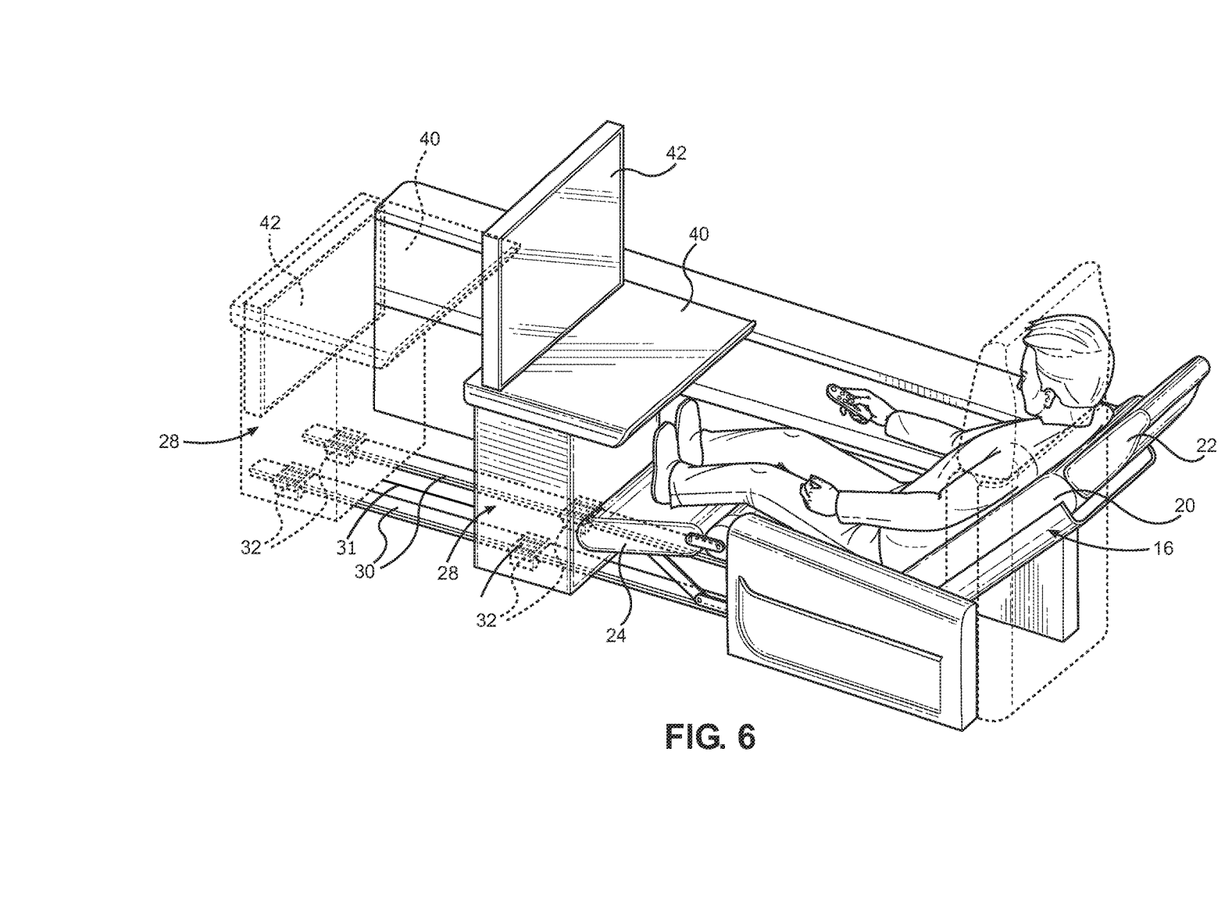
FIG. 6 is a side perspective view of the passenger seat module of FIG. 4, showing the console table locked in, and the monitor extended to a viewing-position with the seat reclined and a footrest extended.

As shown in FIG. 1, each of the modules 10 include a seat 16 positioned toward the rear of the module 10. In such a way that if a passenger is seated on seat 16, the passenger is facing the front of the module 10. Although all of the modules 10, (depicted in FIGS. 1 and 2) are shown facing the front of the airplane 14, one or more modules 10 may be oriented with the front of the module facing the rear of the airplane 14 or in any other suitable direction, such as transverse (along the width of the aircraft) or along the longitudinal axis of the airplane. In any such orientation relative to the vehicle (e.g., an airplane 14 as shown in the enlarged view of FIG. 1), the seated passenger in the seat 16 faces the front of the module 10. The seats 16 have a seat-bottom 18, a seat-back 20, a headrest 22, and a footrest 24 (see FIG. 6). The seats 16 may be an adjustable reclining seat, in which the seat back 20 reclines and the footrest 24 extends upward and outward (see e.g., FIG. 6). The seats 16 may also be configured to adjust to a lay-flat position, in which the seat bottom 18, seat back 20, headrest 22 and footrest 24 form a flat or substantially flat seating surface or bed (see e.g., FIG. 7). The seats 16 are mounted to the floor of the airplane 14 or they may be mounted to a floor (not shown) of their respective modules 10.

Figure 2:
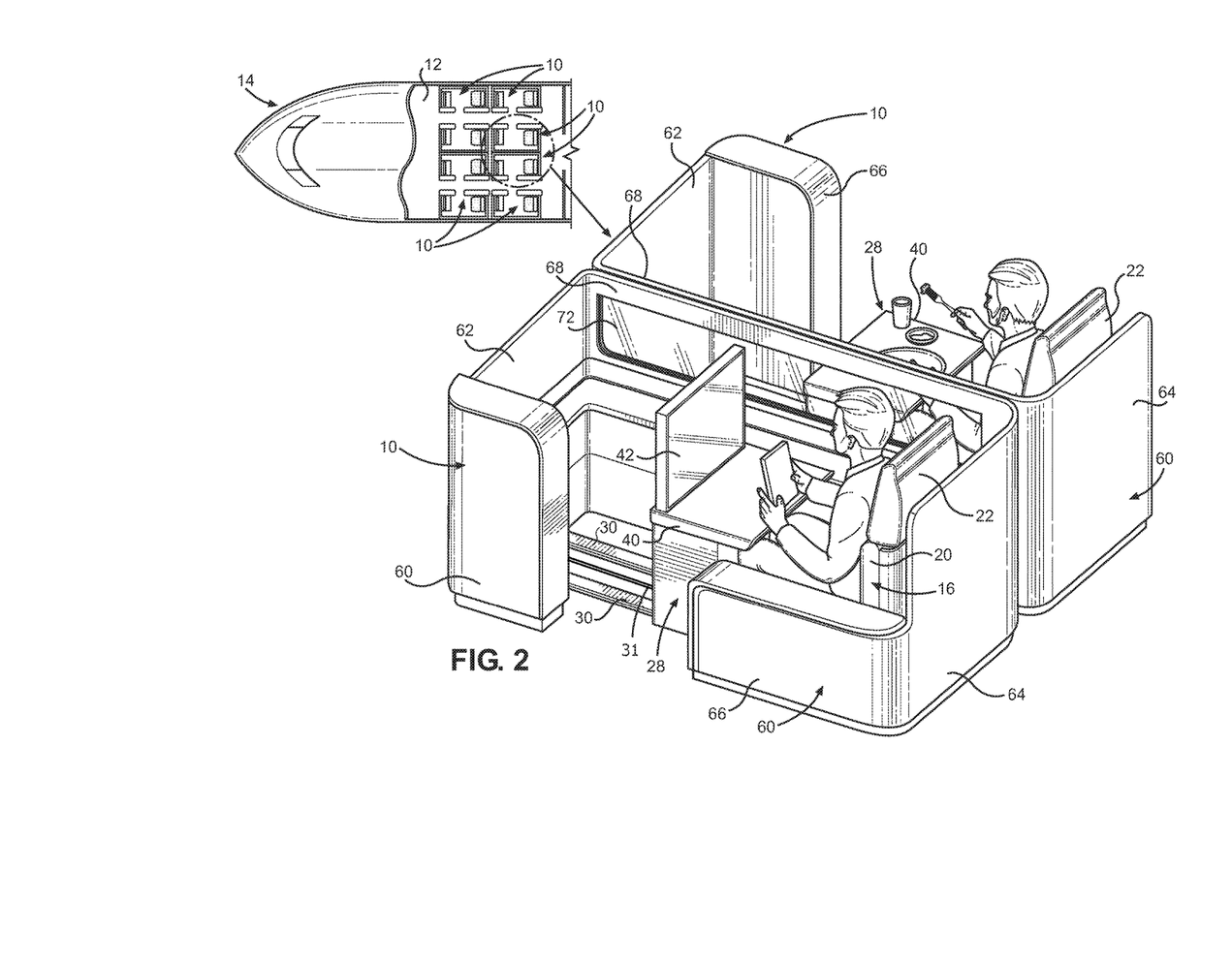
FIG. 2 shows the side-by-side seating arrangement and passenger seat modules similar to FIG. 1, with the consoles shown in a position such that each passenger can conveniently use a table for viewing a monitor (illustrated in the left-side seating module) or for meal functions (illustrated in the right-side seating module), according to one embodiment of the present invention.

Each of the modules 10 has a movable console 28 positioned in front of the seat 16 (see e.g., FIG. 2). The console 28 has a table 40 disposed on the top thereof. The console 28 is slidably coupled to a pair of parallel, laterally spaced rails 30. The rails 30 extend longitudinally along a longitudinal axis of the module 10 from the front of the module to at least proximate the front of the seat 16. The rails 30 may extend further rearward within the module 10, such as under the seat 16 or even to the rear of the module 10.

Figure 5:
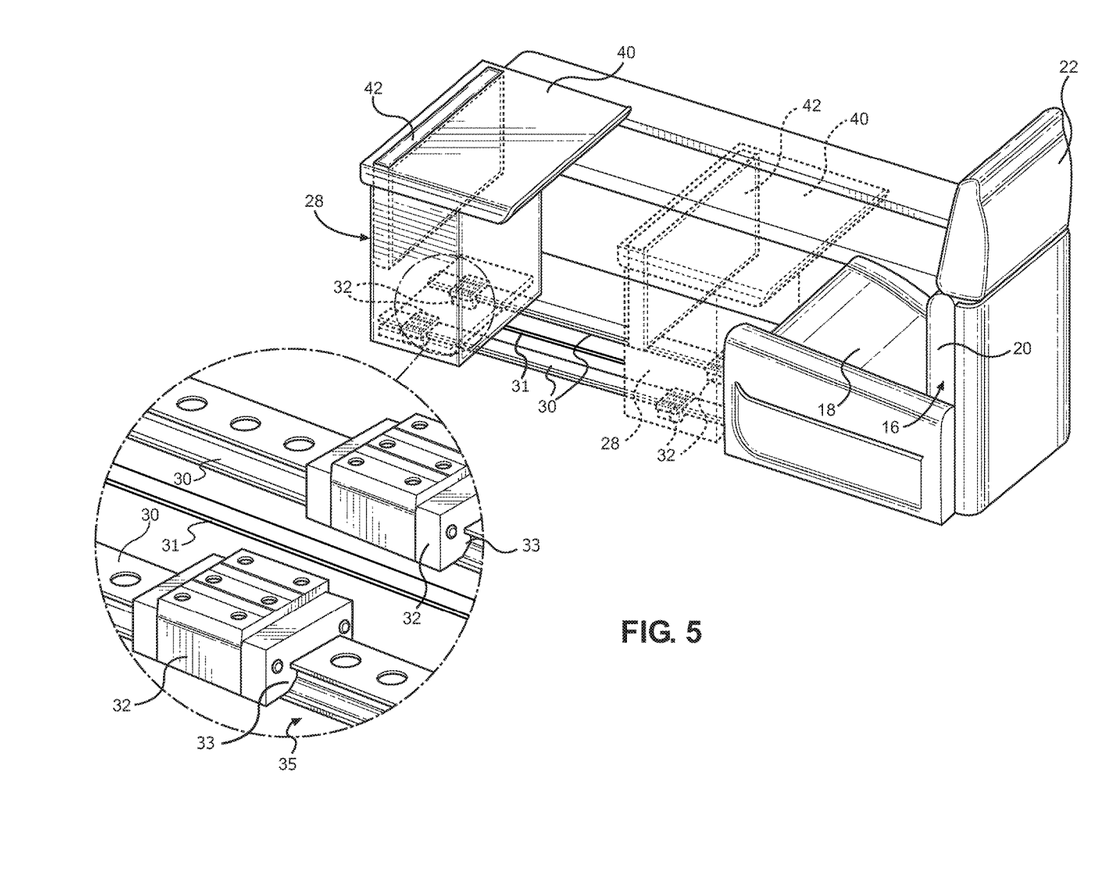
FIG. 5 is a side perspective view of the passenger seat module of FIG. 4, showing the console table locked in a stowed-position and another position of the console in dotted lines, and an enlarged view of the runners, which attach to the bottom of the console and slidably couple to rails, according to one embodiment of the present invention.

FIG. 5 illustrates one embodiment of components for slidably coupling the console 28 to the rails 30, as well as depicting the movement of the console 28 along the rails 30. As shown in FIG. 5, the console 28 has a pair of runners 32 attached to the bottom of the console 28 at spaced apart locations, in this case, one on each side of the console 28, with respect to its longitudinal axis. On each side of the rails 30, a tongue or nose 33 projects inward from its respective runner 32. The tongue or nose 33 slidably projects into a slot or groove 35 on each side of the rail 30. Once each runner 32 is engaged with the grooves 35 on its respective rail 30, each runner 32 slidably moves longitudinally along its respective rail 30. The rails 30 are mounted to the floor 26 of the airplane or to a floor (not shown) of the module 10. The rails 30 may be recessed into the floor 26 or the floor of the module 10, such that the top of the rails 30 is flush or substantially flush with the surrounding floor 26 or floor of the module 10.

Figure 4:
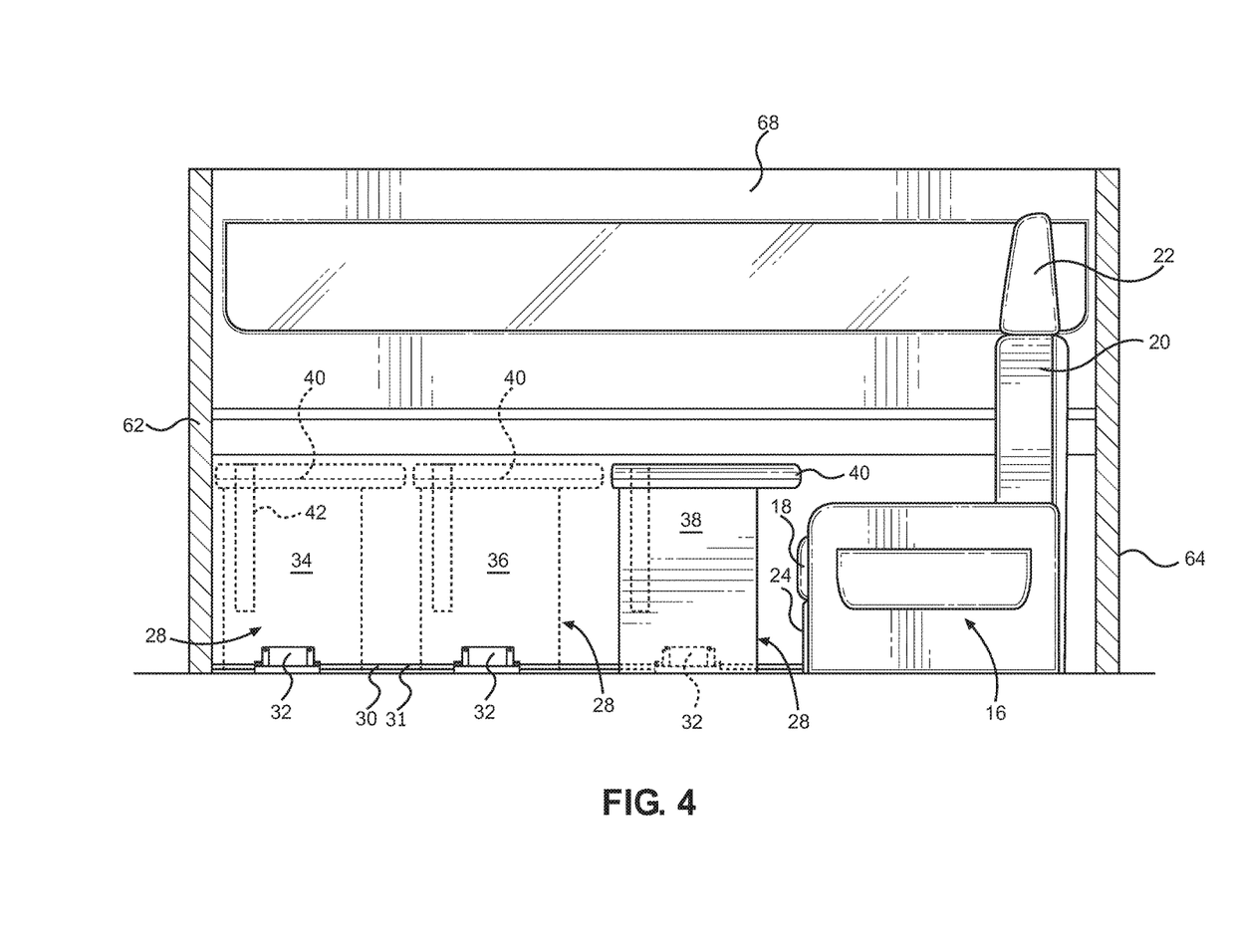
FIG. 4 is side elevational view of one of the passenger seat modules of FIG. 1, showing three different locking positions for a console (one of the locking positions is shown in solid lines and other two are shown in dotted lines), according to one embodiment of the present invention.
Figure 7:
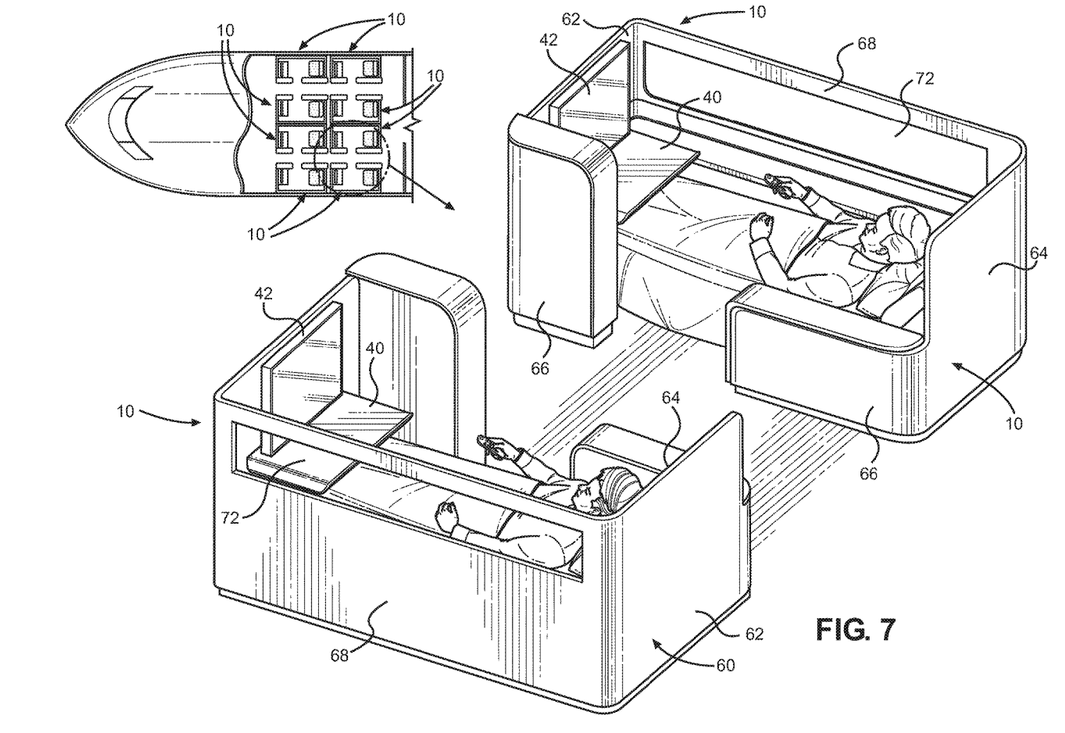
FIG. 7 is a side perspective view of two of the passenger seat modules of FIG. 4 separated by an isle there between, showing the console tables in a stowed position, the video monitors in the viewing-position, with the seats fully extended to a sleeping position and the head lifted from the rest of the body relative to what is shown in FIG. 6, according to one embodiment of the present invention.

As depicted in FIGS. 4 and 5, the movable console 28 is slidable along the rails 30 between a front position 34 at the front of the module 10 and a rear position 38 closer to the front portion of the seat-bottom 18. The position 34 is also known as a "takeoff and landing-position." The front position 34 places the console 28 out of the way (in the rear of module 10) to allow convenient ingress and egress to the seat 16 within the module 10. The takeoff and landing position 34 also provides space to fully recline the seat 16 into a lay-flat seat, as shown in FIG. 7. As depicted in FIG. 2, the rear position 38 positions the console 28 proximate the front of the seat 16 so that the top of the console table 40 is conveniently usable by a passenger as a tray-table for meal functions, or as a desk for work related tasks (such as placing a computer thereon, connecting a laptop, tablet, or other electronic accessories, while performing reading, writing, emailing, or other personal or business desk usages. The position 38 is also known as a "work-position." As shown in FIG. 4, the console 28 may also be positioned at a middle position 36 between the front position 34 and the rear position 38. The middle position 36 positions the console 28 so that the foot rest 24 may be extended, and/or a video monitor 42 disposed in the console 28 may be comfortably viewed by a passenger seated in the module 10. The position 36 is also known as a "recline-position."

The module 10 may be configured to have one or more lockable positions for locking the movable console 28 in at a temporary stationary position. For instance, the console 28 may be lockable in the three positions shown in FIG. 4, namely the front position 34, the middle position 36 and the rear position 38. The runners 32 may include a locking device, such as a mechanical lever or catch, which locks to a set of mating detents disposed in one or more of the rails 30 (not shown). The module 10 may include a motorized runner-actuator 31, which moves the console 28 horizontally along the rails 30. The motorized runner-actuator 31 may include a controller programmed to trigger the actuator 31 to lock the movable console 28 at one of the three possible lockable positions as shown in FIG. 4.

Figure 8:
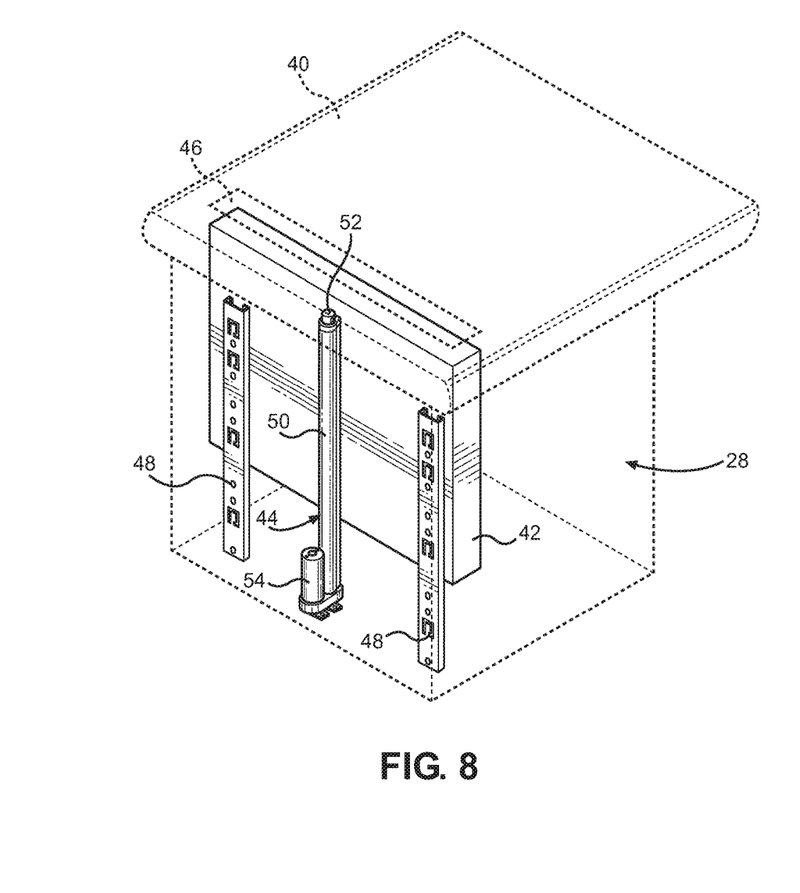
FIG. 8 is a rear, perspective, view of the console of the passenger seat module of FIG. 4 having a motorized lift-actuator coupled to the video monitor, according to one embodiment of the present invention.

Referring to FIGS. 1, 2, 4, 5, 6, 7 and 8, the video monitor 42 is disposed in the console 28 such that it can be lifted or raised vertically through an opening 46 in the top of the table 40. The lift of the video monitor 42 ranges between a stowed position below the table (see FIGS. 1, 4, 5 and 8) and a viewing position above the table (see FIGS. 2, 6 and 7). The video monitor 42 may be any suitable video monitor including an LCD monitor, an LED monitor, a smart monitor having a processor and operating system (e.g., iOS from Apple Corp., WINDOWS™ or mobile WINDOWS™ from Microsoft Corp., ANDROID™ from Google, Inc. or Alphabet, Inc.) capable of running software application (e.g., "apps") or other electronic display for displaying video or receiving or recording programming. In the illustrated embodiment, the video monitor 42 lifts substantially vertically through the opening 46 in the top of the console table 40 between the stowed position and the viewing position. As shown in FIG. 8, a motorized lift actuator 44 may be mounted in the console 28 and coupled to the video monitor 42 for controlling the lift of the video monitor 42. The video monitor 42 may be coupled to the console 28 using a pair of telescoping rails which support and guide the video monitor 42 as it moves or lifts between the stowed-position and the viewing-position. The motorized lift-actuator 44 may be any suitable motorized actuator, such as a first telescoping member 52 slidably received in a second telescoping member 50 and a motor 54 configured to move the second telescoping member 52 longitudinally relative to the second telescoping member 50. Both motor 54 and the first telescoping member 50 are coupled to the console 28, while the second telescoping member 52 is coupled to the video monitor 42.

As shown in FIG. 1 and FIG. 2, each module 10 also includes an enclosure 60, which adds privacy to the modules 1, it encloses by providing some physical separation from the adjacent modules 10 and the rest of the cabin 12. Enclosure 60 may include an opening on one of its sides for passengers to enter/exit and access module 10 and/thus providing a walkway for attendants, if needed. Besides a side opening, the enclosure 60 is enclosed by five adjoining walls. As shown in FIG. 1, the enclosure 60 includes two front walls 66 on each side of the entrance opening 70, a front wall 62 (where the console 28 is docked during takeoff and landing near the front of the module 10), a rear wall 64 (behind the seat 22 of the module 10) and a second contiguous side wall 68 extending from the front wall 62 to the rear wall 64 (located behind the seat of module 10). The side walls 66 typically have an entrance-opening 70 for a passenger to enter or exit the module 10. The enclosure walls 62, 64, 66 and 68 may be of the same height, or varying heights, and may extend to a height below the ceiling of the cabin 12 or fully to the ceiling of the cabin 12. One or more of the walls 62, 64, 66 and 68 may have a window or opening, such as the window 72 shown in the second contiguous side wall 68.

As shown in FIG. 1, the passenger seat modules 10 may be installed in a vehicle, such as in an aircraft cabin 12 of an airplane 14, as follows. The rails 30 are mounted in the floor 26 of the airplane 14. In the case that the module 10 has a separate floor, with the floor of the module 10 is mounted to the floor 26 of the airplane 14, the rails 30 in this situation are mounted in the floor of the module 10. Alternatively, the rails 30 may be pre-mounted in the floor of the module 10, and then the floor and rails 30 may be mounted to the floor of the airplane 14. The seat 16 is mounted to the floor 26 or the floor of the module 10, as the case may be, at the rear of the module 10. The console 28 is generally provided with a table tray 40 pre-attached or pre-installed on its top surface. The video monitor 42 may be installed in the console 28 before or after the console 28 is coupled to the rails 30. The enclosure 60 is mounted to the aircraft floor 26 or the floor of the module 10, as the case may be. The enclosure 60 may be mounted before or after the other components have been installed, such as the rails 30, seat 16 and movable console 28.

The operation of the module 10 is straightforward. As shown in FIG. 4, the console 28 is positioned in the front position 34 for passenger loading/boarding and takeoff in the case of an airplane. During airplane takeoff, the movable console 28 is locked in the front position 34, as described earlier (see FIG. 4). Once the airplane is at altitude and it is safe for passengers to move around the aircraft, permission may be granted to adjust the movable console 28. In that case, the movable console 28 may be unlocked from the front position 34 and moved to the intermediate position 36 or to the rear position 38 by actuating the motorized runner-actuator 31, or by using a console controller (see FIG. 8) as applicable. For instance, the passenger controller may be disposed in the seat 16 or in another controller such as a lift-controller for the entertainment system. During normal cruising operation, the video monitor 42 may be lifted from its stowed position to the viewing position by actuating the motorized lift-actuator or by using a monitor controller. The monitor lift-controller may be integrated with the console controller or it may be a separate controller. The seat 16 may be adjusted consistent with the positions of the movable console 28, as described above.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. While the passenger seat module 10 has been described for use in an airplane, it can be configured and utilized with any vehicle. Accordingly, embodiments are intended to exemplify alternatives, modifications, and equivalents that may fall within the scope of the claims. The invention, therefore, should not be limited, except to the following claims, and their equivalents.

What is claimed is:

1. A passenger seat module for installation inside an airplane, comprising:
    an enclosure for installing within walls of the airplane, the enclosure including a front wall, a rear wall, a first side wall extending from the front wall to the rear wall on a first side of the module, and a second side wall extending from the front wall to the rear wall on a second side of the module opposite the first side, wherein the first side wall has an entrance opening for a passenger to enter or exit the module;
    a seat positioned at a rear of the enclosure and facing toward a front of the enclosure;
    a console positioned straight ahead in front of the seat such that the console opposes a front portion of the seat, the console slidably coupled to a pair of laterally spaced apart rails, the parallel rails extending longitudinally from the front of the module to proximate the front portion of the seat, the console slidable along the rails between the front of the module and proximate the front portion of the seat, the console having a table on a top surface of the console; and
    a video monitor disposed in the console.

2. The passenger seat module of claim 1, further comprising a front wall at the front of the module, a rear wall at the rear of the module, a first side wall extending from the front wall to the rear wall on a first side of the module, and a second side wall extending from the front wall to the rear wall on a second side of the module opposite the first side, wherein the first side wall has an entrance opening for a passenger to enter or exit the module.

3. The passenger seat module of claim 1, wherein the rails extend along a longitudinal axis which extends under the seat.

4. The passenger seat module of claim 1, wherein the table has an opening through which the video monitor is liftable between a stowed position below the table and a viewing position above the table.

5. The passenger seat module of claim 4, further comprising a motorized lift-actuator coupled to the video monitor, which moves the video monitor between the stowed position and the viewing position.

6. The passenger seat module of claim 5, wherein the motorized lift-actuator comprises cooperating telescoping members and a motor configured to slide a first telescoping member relative to a second telescoping member, and the video monitor is mounted to the console using at least two telescoping rails.

7. The passenger seat module of claim 1, wherein the console is movable to at least three positions along the rails in which the console can be locked in position thereby preventing the console from moving along the rails, including a first position at the front of the module, a second position proximate the front of the seat, and a third position between the first position and second position such that the console is spaced apart from the seat to allow a footrest to extend forward from the seat.

8. The passenger seat module of claim 7, further comprising a motorized runner-actuator for moving the console along the rails to each of the three positions.

9. A passenger seat module for installation inside an airplane, comprising:
    an enclosure for installing within walls of the airplane, the enclosure including a front wall, a rear wall, a first side wall extending from the front wall to the rear wall on a first side of the module, and a second side wall extending from the front wall to the rear wall on a second side of the module opposite the first side, wherein the first side wall has an entrance opening for a passenger to enter or exit the module;
    a seat positioned at a rear of the enclosure and facing toward the front wall;
    a console positioned straight ahead in front of the passenger seat such that the console opposes a front portion of the seat, the console slidably coupled to a pair of laterally spaced apart rails, the parallel rails extending longitudinally from a front end proximate the front wall to a rear end proximate the front portion of the seat, the console slidable along the rails between the front end and the rear end;
    a table mounted on top of the console, the table having an opening through which a video monitor lifts from a stowed position below the table to a viewing position above the table,
    the video monitor movably coupled to the console, the video monitor movable between the stowed position to the viewing position.

10. The passenger seat module of claim 9, further comprising a motorized runner-actuator for moving the console along the rails.

11. The passenger seat module of claim 9, wherein the rails extend along a longitudinal axis which extends under the seat.

12. The passenger seat module of claim 9, wherein the video monitor lifts substantially vertically when moving from the stowed position to the viewing position.

13. The passenger seat module of claim 12, further comprising a motorized lift-actuator coupled to the video monitor, which moves the video monitor from the stowed position to the viewing position.

14. The passenger seat module of claim 13, wherein the motorized lift-actuator comprises cooperating telescoping members and a motor configured to slide a first telescoping member relative to a second telescoping member, and the video monitor is mounted to the console using at least a pair of telescoping rails.

15. The passenger seat module of claim 9, wherein the console is movable to at least three positions along the rails in which the console can be locked in position thereby preventing the console from moving along the rails, including a first position at the front of the module, a second position proximate the front of the seat, and a third position between the first position and second position such that the console is spaced apart from the seat to allow a footrest to extend forward from the seat.

16. The passenger seat module of claim 15, further comprising a motorized runner-actuator for moving the console along the rails to each of the three positions.

17. A passenger seat module for installation inside an airplane cabin having a floor and walls, comprising:
- an enclosure for installing within the walls of the vehicle, the enclosure including a front wall, a rear wall, a first side wall extending from the front wall to the rear wall on a first side of the module, and a second side wall extending from the front wall to the rear wall on a second side of the module opposite the first side, wherein the first side wall has an entrance opening for a passenger to enter or exit the module;
- a seat positioned at a rear of the enclosure and facing toward a front of the enclosure;
- a console positioned straight ahead in front of the passenger seat such that the console opposes a front portion of the seat, the console slidably coupled to at least one rail disposed in the floor, the at least one rail extending longitudinally from the front of the module to proximate the front portion of the seat, the console slidable along the at least one rail between the front of the module and proximate the front portion of the seat, the console having a table on a top of the console; and
- a motorized runner-actuator coupled to the console for moving the console along the at least one rail.

18. The passenger seat module of claim 17, wherein the console is movable to at least three positions along the at least one rail in which the console can be locked in position thereby preventing the console from moving along the at least one rail, including a first position at the front of the module, a second position proximate the front of the seat, and a third position between the first position and second position such that the console is spaced apart from the seat to allow a footrest to extend forward from the seat.

19. The passenger seat module of claim 17, further comprising a video monitor disposed in the console.

20. The passenger seat module of claim 19, wherein the table has an opening through which the video monitor is liftable substantially vertically between a stowed position below the table and a viewing position above the table, and further comprising a motorized lift-actuator coupled to the video monitor, which lifts the video monitor between the stowed position and the viewing position.

* * * * *